March 21, 1944.    A. N. WARBURTON, JR    2,344,839
EVAPORATOR
Filed Sept. 3, 1940
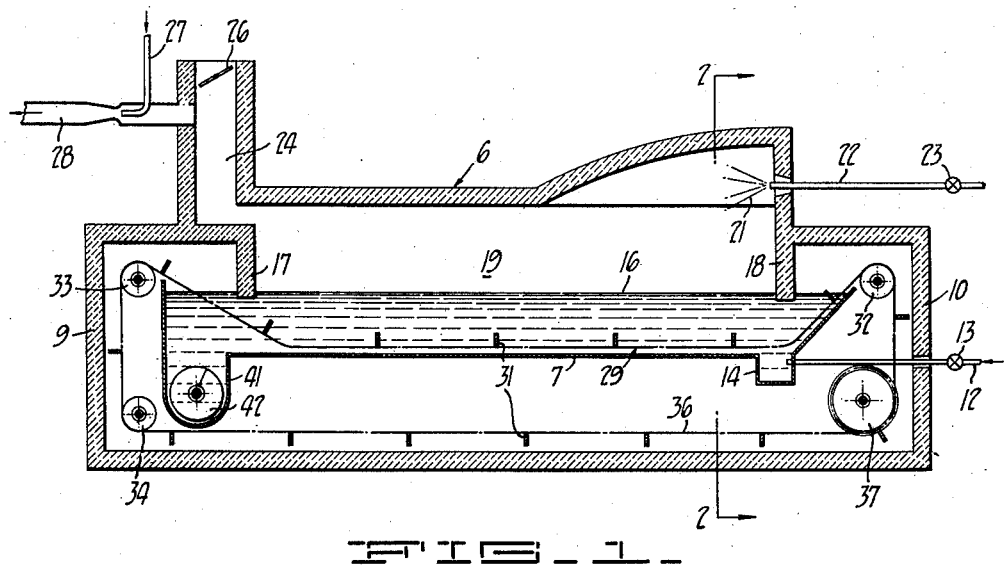
FIG_1_
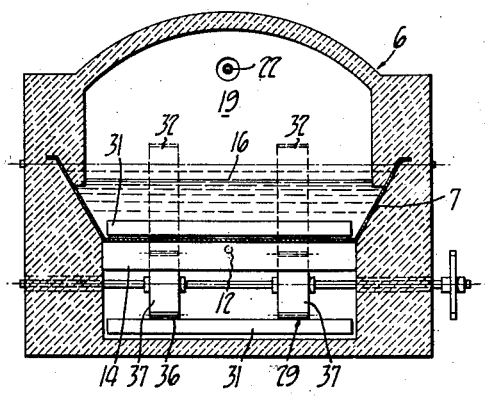
FIG_2_
INVENTOR
Alfred N. Warburton Jr.
BY
Marcus Lothrop Patented Mar. 21, 1944

2,344,839

UNITED STATES PATENT OFFICE 2,344,839

EVAPORATOR

Alfred N. Warburton, Jr., Oakland, Calif., assignor of one-half to Henry Kirchmann, Jr., San Francisco, Calif.

Application September 3, 1940, Serial No. 355,131

1 Claim. (Cl. 159—16)

My invention relates to means for removing liquids from contained solid materials and is concerned particularly with means for separating liquid from contained inorganic and organic materials intermixed therewith, especially those which are evolved during the course of treating fish in fish reduction plants.

In the customary fish reduction plant there is evolved at one stage in the process a liquid material referred to as press water or stick water, which is largely aqueous and contains a large amount of solid inorganic and organic material having commercial value. Some of the solid materials, particularly complex organic chemicals, are deleteriously affected by heat, yet it is necessary to separate such materials from the stick water by means of evaporation.

It is therefore an object of my invention to provide an evaporator for evaporating the water from the remaining solids in materials such as stick water, without thermally injuring the solids or other residue.

Another object of my invention is to provide a thermal evaporator which is capable of satisfactory use despite a relatively high concentration of solid material within the carrying liquid.

Another object of my invention is to provide an evaporator which is well adapted for continuous operation.

Another object of my invention is to provide an evaporator which in general is a distinct improvement over evaporators now available for similar purposes.

Another object of my invention is to provide an evaporator in which the heat and material to be evaporated are in thermal contact so that the liquid in evaporating serves to protect and partially insulate heat labile solid materials within the liquid, such as vitamins, hormones and proteins.

The foregoing and other objects are attained in the embodiment of the invention illustrated in the drawing, in which Fig. 1 is a longitudinal cross-section, largely diagrammatic, of an evaporator constructed in accordance with my invention; and Fig. 2 is a cross-section the plane of which is indicated by the line 2—2 of Fig. 1.

In its preferred form, the evaporator of my invention comprises an enclosed chamber in the upper portion of which an exposed flame is produced and in which is disposed a container for liquid carrying solid material, such container spanning the chamber transversely but being somewhat spaced from the ends thereof and being so located in conjunction with depending walls that the liquid provides with the walls a segregated compartment for the flame. In addition, the container is provided with a conveyor mechanism for advancing the separated solid material to a conveyor conducting the material to the outside of the chamber.

While the evaporator of my invention is capable of embodiment in various different forms, in accordance with particular commercial requirements, it is well exemplified by the diagrammatic disclosure herein. In the current form, the evaporator includes an enclosed chamber, generally designated 6, largely if not entirely constructed of refractory brick. The chamber has situated within it a container 7, preferably of metal, and generally trough-shaped. The container is somewhat longer than it is wide and extends horizontally from side to side of the chamber 6, being embedded in the walls thereof as shown in Fig. 2. Adjacent its ends, however, the container 7 is spaced from the end walls 9 and 10 of the chamber to provide passageways.

The container 7 is supplied with press water or stick water from any suitable source (not shown) through a conduit 12 having a control valve 13 therein. The conduit extends through the end wall 10 and enters the container 7 through a sump 14. The operation of the valve 13 is such that the liquid and the solids contained therein are maintained within the container as a body at a level 16 which is slightly below the upper edge of the container but is above the lower ends of depending walls 17 and 18. The walls 17 and 18 extend from the walls of the chamber 6 and, with the surface of the liquid 17, divide the interior of the chamber into portions, one of which segregated portions is in the nature of a compartment 19. This segregated compartment is for combustion, and there is supplied at one end of it fuel for producing an exposed flame 21, such supply being through a pipe 22 controlled by a valve 23. The water inlet 12 and the fuel pipe 22 discharge in the same general direction, so that there is concurrent flow, although countercurrent or cross-current flow is also suitable. The exposed flame 21 is therefore immediately and directly effective upon the body of liquid within the container 7 to evaporate the aqueous portions thereof and any other materials which will vaporize at substantially the boiling temperature of water. But, so long as there is a body of liquid maintained in the container, the temperature thereof does not increase above the boiling temperature of water, and hence the organic or solid contents are not thermally damaged.

There is a further distinction between this arrangement and one in which the flame heat is conducted to the container through a metallic wall thereof. Where there is an interposed metallic wall, solids are able to deposit upon the wall and local temperatures can increase greatly in excess of the boiling temperature of water, thereby destroying some of the commercial values. In the present instance, however, the interior of the compartment 19 is always substantially at atmospheric pressure, and hence the temperature cannot greatly vary from 212° Fahrenheit within the body of material in the container. Hence, the transfer of heat, although very intense and highly efficient and effective, is not destructive of values.

The products of combustion from the flame 21 pass lengthwise through the compartment 19 and normally are discharged through an outlet flue 24. In some cases, however, since the products of combustion are largely mixed with evaporated water or steam, such steam and products of combustion are usable elsewhere in related processes. Under those conditions, I provide a damper 26 which can be closed, and an ejector 27 preferably utilizing relatively high-pressure steam for drawing off the products of combustion and evaporated water from the compartment 19. These are discharged together through an outlet 28 in any suitable fashion.

As the solid-bearing liquid contents of the container 7 are increased in concentration by evaporation of the liquid, the solids, which tend to settle toward the bottom, are advanced toward the outlet by means of a conveyor 29 comprising a plurality of chains having cross-slats 31 secured thereto, such cross-slats preferably being of wood. The upper run of the conveyor extends from guide rollers 32 just above one end of the container 7 adjacent the end wall 10, down into and through the container along the bottom thereof, thence upwardly and out of the container over guide rollers 33 adjacent the other end wall 9, thence downwardly over guide rollers 34 so that the lower run 36 then passes over a drive sprocket 37 and back to the point of beginning.

The operation of the conveyor 29 is effective to advance the deposited solids along the bottom of the container, and, adjacent one end, the container has a substantial depression 41 in which the solids gather and from which they are removed to the outside of the chamber 6 by means of a screw conveyor 42 or other suitable discharge means.

With the present arrangement, the construction of the liquid container and associated walls is such that the exposed flame is confined so that heat is not transferred to the remaining, enclosed parts of the structure, and the arrangement is also such that the conveyor, although entering into the confined part of the enclosure, does so through a water seal which precludes the loss of heat. Thus, not only is the structure mechanically and thermally satisfactory and efficient, but the treated material is continuously handled without danger of destruction of values.

I claim:

An evaporator comprising means enclosing a chamber, means for producing an exposed flame in the upper portion of said chamber, a container within and spaced from the ends of said chamber, means for supplying said container with a liquid, means including walls depending from said enclosing means into said liquid for segregating the upper portion of said chamber from the remainder thereof, a depression in one end of said container, means including a conveyor passing over the ends of said container for advancing material toward one end of said container and depositing said advanced material in said depression, and means for removing said deposited material from said depression.

ALFRED N. WARBURTON, Jr.